(12) United States Patent
Holt

(10) Patent No.: US 6,522,296 B2
(45) Date of Patent: Feb. 18, 2003

(54) METHOD AND SYSTEM FOR CALIBRATING WIRELESS LOCATION SYSTEMS

(75) Inventor: Brian Holt, Melbourne, FL (US)

(73) Assignee: Harris Corporation, Melbourne, FL (US)

(*) Notice: Subject to any disclaimer, the term of this patent is extended or adjusted under 35 U.S.C. 154(b) by 1 day.

(21) Appl. No.: 09/891,107

(22) Filed: Jun. 25, 2001

(65) Prior Publication Data

US 2002/0196186 A1 Dec. 26, 2002

(51) Int. Cl.$^7$ ................................................ G01S 3/02
(52) U.S. Cl. ........................ 342/453; 342/463; 342/465
(58) Field of Search ............................... 342/450, 453, 342/457, 463, 465, 165, 174; 455/65, 456, 457

(56) References Cited

U.S. PATENT DOCUMENTS

| | | | |
|---|---|---|---|
| 4,799,062 A | | 1/1989 | Sanderford, Jr. et al. ... 342/450 |
| 5,469,172 A | * | 11/1995 | Schleder et al. ............. 342/174 |
| 5,550,549 A | | 8/1996 | Procter, Jr. et al. ........... 342/47 |
| 5,687,196 A | | 11/1997 | Proctor, Jr. et al. .......... 375/347 |
| 5,719,584 A | | 2/1998 | Otto ............................. 342/465 |
| 5,752,218 A | * | 5/1998 | Harrison et al. ............. 701/207 |
| 5,959,580 A | | 9/1999 | Maloney et al. ............. 342/457 |
| 6,026,304 A | | 2/2000 | Hilsenrath et al. .......... 455/456 |
| 6,094,168 A | | 7/2000 | Duffett-Smith et al. ..... 342/463 |
| 6,119,013 A | | 9/2000 | Maloney et al. ............. 455/456 |
| 6,184,829 B1 | | 2/2001 | Stilp ............................ 342/387 |
| 6,281,834 B1 | * | 8/2001 | Stilp ............................ 342/174 |
| 6,317,081 B1 | * | 11/2001 | Stilp ............................ 342/387 |

* cited by examiner

Primary Examiner—Dao Phan
(74) Attorney, Agent, or Firm—Allen, Dyer, Doppelt, Milbrath & Gilchrist, P.A.

(57) ABSTRACT

This invention relates to a method for calibrating a wireless location system (WLS) to enable the system to make highly accurate differential measurements such as time difference of arrival (TDOA) and frequency difference of arrival (FDOA). Calibration is accomplished by transmitting a signal from an unknown location and measuring at each of two receivers the parameter to be calibrated from that part of the received signal reflected or refracted from an object at a known location in the area. A differential measurement error is determined by comparing the expected difference in the parameter measurements with the actual difference in the parameter measurements. The expected difference is known, a priori, based on the locations of the receivers and the location of the object.

40 Claims, 12 Drawing Sheets

LAYOUT OF INDIVIDUAL IMAGES OF A BUILDING IN THE CBTM

TOP VIEW

3D VIEW

METHOD AND SYSTEM FOR CALIBRATING WIRELESS LOCATION SYSTEMS

FIELD OF THE INVENTION

This invention relates to a method and system for calibrating a wireless location system (WLS) to enable the system to make highly accurate differential measurements such as time difference of arrival (TDOA) and frequency difference of arrival (FDOA).

BACKGROUND OF THE INVENTION

Wireless location systems are becoming increasingly important. An example is disclosed in commonly assigned U.S. Pat. No. 5,719,584 to Otto, the disclosure which is incorporated by reference in its entirety. Many wireless location systems use time difference of arrival (TDOA) calculations to determine a set of possible locations of a transmitter of a signal. The location is mathematically determined, as a hyperbola in two dimensions and a hyperboloid in three dimensions, from the known locations of two receivers and the difference in the measured time of arrival (TOA) of the signal at those two receivers. These systems use a variety of methods to measure the TOA of a signal at a receiver. All share, however, the common requirement that the clocks must either be synchronized or the offset between the clocks measured and a correction applied. The correction may be applied either directly to the clocks or mathematically to the calculations of time differences.

In many wireless location systems an attempt is made to synchronize the clocks at the receivers. A popular method is to use a clock source at each of the receivers that is synchronized to the global positioning system (GPS) transmissions. These systems often use an oscillator with good short-term stability to drive the clock and apply a correction based on the filtered difference between a received GPS timing signal, which has good long term stability, and the clock. These systems require a GPS receiver and GPS antenna with a clear view of multiple GPS satellites.

Despite significant recent advances in these systems, the root-mean-square (RMS) difference in time between two such clocks may be as high as many tens to hundreds of nanoseconds resulting in significant errors in location estimates, particularly when geometric dilution of precision (GDOP) is significant. Although synchronization of the clocks in this manner may reduce TOA measurement errors due to clock offsets, the system must also be carefully designed and calibrated to ensure that delays in the receiver processing (both the signal processing chain and the timing distribution chain) are fixed and properly taken into account.

Some prior art systems use external calibration techniques to correct clock offsets and to correct for other variations in the receivers that may introduce TOA (and, therefore TDOA) measurement errors or errors in other measured parameters such as frequency of arrival (FOA). In these systems, receivers at known locations measure certain parameters of a signal transmitted by a stationary reference transmitter at a known location. The measured parameters are then communicated to a common point where a processor calculates offsets or adjustments that are either used to adjust one or both of the receivers or are applied to the time difference of arrival (TDOA) and/or frequency difference of arrival (FDOA) calculations.

One such prior art wireless location system as disclosed by U.S. Pat. No. 6,184,829 to Stilp, reduces instrumentation error by a calibration process where by multiple wireless transmitters, such as cellular telephones, are placed at known locations throughout the coverage territory of the wireless location system. These phones make transmissions, such as periodic registrations or page responses, in a manner similar to any other phone. Because the location and the theoretical TDOA values for any pair of receivers are known a priori, the system can determine the error in the TDOA measurements made in connection with a particular pair of receivers.

In addition, because the phones are in fixed locations and there is no Doppler shift, the theoretical FDOA value is zero. Any measured error will be caused by drifts in the oscillators at each of the receivers, changes in the characteristics of analog components (e.g., the antennas, cabling, and filters), and environmental factors. A correction is applied to the computed TDOA and FDOA values in the digital signal processing stages of the system.

These prior art external calibration systems have several limitations. Periodic transmissions must be made by reference transmitters at known locations and use system capacity that might otherwise carry normal user traffic. If a long period elapses between calibration and a subsequent TDOA and/or FDOA measurement, then the calibration may be degraded by oscillator offsets or changes in the receivers because to such things as component parameter shifts are caused by temperature. Although reducing the interval between reference transmissions improves calibration, it is at the further expense of additional system capacity. Another drawback is that multipath induced errors in the time of arrival measurements made by the receivers during calibration, i.e., when measuring the TOA/TDOA of the reference transmissions, corrupt the TDOA calibration since straight-line propagation from the reference transmitter to each receiver is presumed.

SUMMARY OF THE INVENTION

It is therefore an object of the present invention to provide a method for external calibration of wireless location systems that reduces or removes TDOA, FDOA and/or other differential measurement errors arising from many sources within the system.

It is another object of the present invention to provide a system and method for calibrating wireless location systems that is operable with reference transmitters of unknown location that may be stationary or mobile with unknown vector velocity.

It is yet another object of the present invention to provide a system and method for calibrating wireless location systems that may use normal user traffic transmissions from unknown locations by stationary or mobile transmitters of unknown vector velocity as reference transmitters thereby minimizing the system capacity used for calibration and reducing or eliminating degradation in calibration due to system drift between the instant of calibration and the instant of a measurement.

It is yet another object of the present invention to provide a system and method for calibrating wireless location systems that does not require a straight-line propagation path from reference transmitters to receivers in order to accurately calibrate TDOA or other difference measurements.

It is still another object of the present invention to provide a system and method for calibrating wireless location systems that is useful in systems using fixed, mobile or both fixed and mobile receivers.

In accordance with the present invention, a system and method determines the offsets of pairs of receivers used in making TDOA, FDOA and/or other differential measurements of signals. A transmitter at an unknown location can be is either stationary or mobile with unknown vector velocity. A plurality of fixed or mobile receivers of substantially known or determinable location (and, in the case of moving receivers making FOA measurements, of known vector velocity) receive the signal from the transmitter via multiple paths due to reflection and refraction of the signal by natural or manmade objects in the vicinity of the transmitter and/or receivers. The signal arriving at a receiver may or may not include a straight-line path signal from the transmitter to that receiver.

Each receiver measures the TOA and/or FOA or other parameter of at least one, and in some embodiments several or all, of the path signals believed not to be a straight-line path. Although not necessary for purposes of calibration, it is preferable that the receiver also measure the TOA and/or FOA of the straight-line path signal, if present, for use in the course of performing transmitter location and velocity determination which may occur coincident with calibration.

A processor is operatively connected to the plural receivers and selects a stationary natural or manmade object that is believed to have reflected or refracted the signal to each of the plural receivers and designates that object as a proxy reference transmitter, also referred to in some instances as proxy receiver because it "receives" a signal and reflects or refracts the "received" signal end thus acts as a "proxy reference transmitter" of the signal. Hereafter, the signal reflected or refracted by that object to the plural receivers may be referred to as a proxy reference transmission.

The location of the proxy reference transmitter is either stored in a database operative with the processor or determinable from information stored in the database such as, but not limited to, aerial photographic imagery. The processor then determines the differential measurement, for each combination of receiver pairs receiving the proxy reference transmission. In the case of FDOA, because the proxy reference transmitter is a stationary object and the Doppler shift imparted by any motion of the transmitter relative to the proxy reference transmitter is common to the reflected or refracted signal at both receivers, the theoretical FDOA value is zero. Any measured error will be due to drifts in the oscillators at each of the receivers, changes in the characteristics of analog components (e.g., the antennas, cabling, and filters), and environmental factors.

The processor may also calculate the theoretical TDOA values for each pair of receivers receiving the proxy reference transmission. The processor determines the expected TDOA from the TOA of the proxy reference transmission at each of the receivers; the locations of the receivers, which are either known a priori and stored in the database or determinable from information stored in the database; and the location of the proxy reference transmitter, which is either known a priori and stored in the database or determinable from information stored in the database. The processor then either applies corrections to the wireless location system equipment to correct the offsets or applies corrections to the computed TDOA, FDOA or other parameter values, obtained during normal system operation, in the digital signal processing stages of the system.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
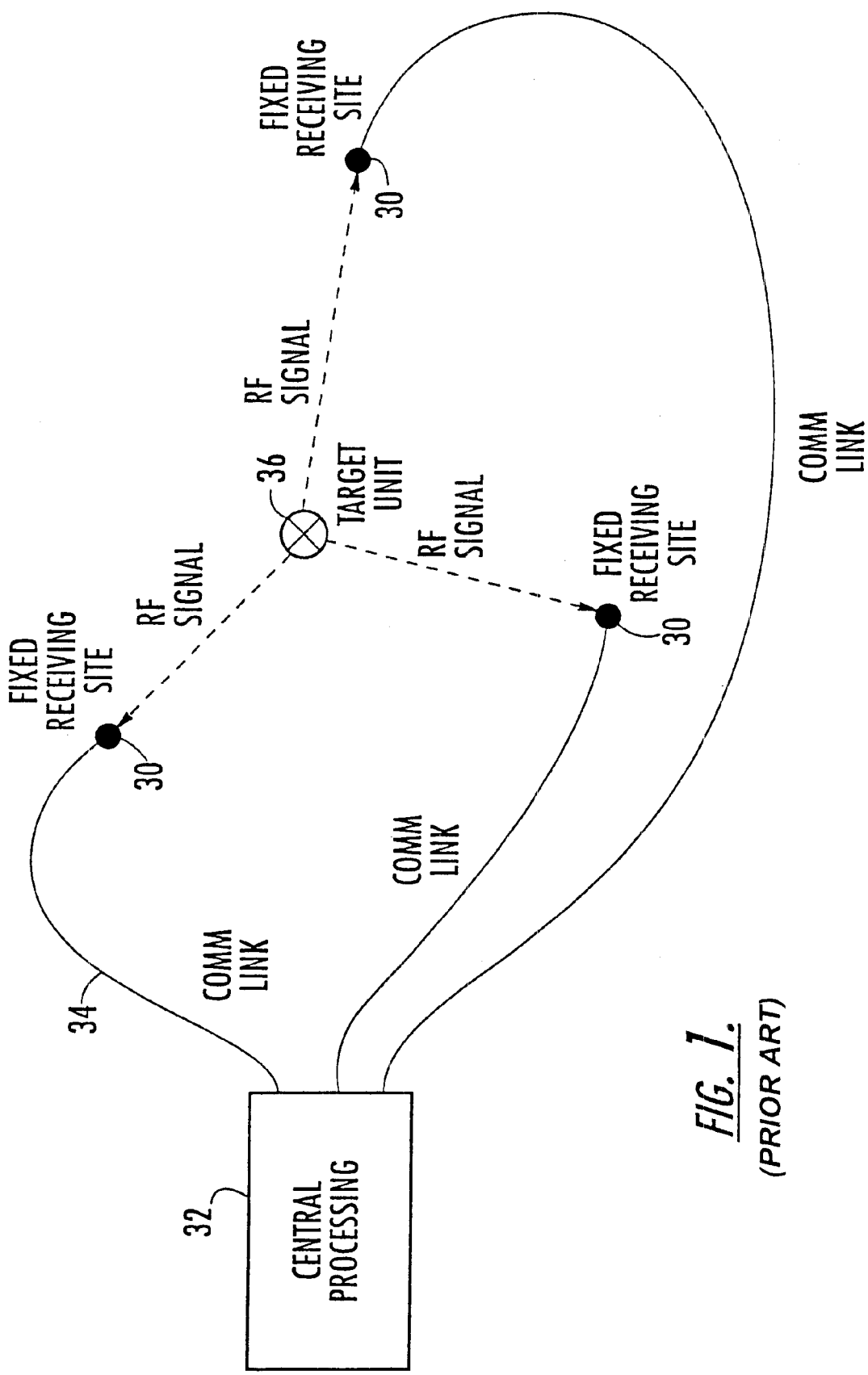
FIGS. 1 and 2 illustrate a prior art Angle of Arrival and Time of Arrival location determining system.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous and allows the use of one receiver at a receive site to determine the location of a mobile transmitting unit, such as a transmitting tag for a car or individual wearing the tag, a mobile transceiver, or other mobile unit. The system uses a proxy receiver (or passive reflector) for Time of Arrival and/or Time of Difference of Arrival calculations. Throughout the description, the term proxy receiver is used for a reflector/refractor located at a location called a proxy receive site (PRS) and also used to describe any type of passive reflector, such as a building, mountain, or hill, water tower, or any other natural or man-made object that would reflect and/or refract (or diffract) the signal from a transmitting mobile unit or other radio transmitter to a receiver that could be fixed or mobile. In some instances, the proxy receiver reflects or refracts signals, such as for calibration, and could be referred to as a reference proxy transmitter. The term mobile unit can refer to any transmitter, fixed or moving, for purposes of description.

Naturally, the signals can be radio frequency signals, electromagnetic signals, or other signal types known to those skilled in the art. For example, some water towers are an excellent reflector of radio frequency signals, and the water tower itself could be a proxy receiver. A large hill could be a proxy receiver and a building, which not only would reflect radio frequency signals, but also diffract/refract radio frequency signals around a building corner edge.

The present invention is also advantageous because it allows the use of a look-up table or geographical software imaging database, such as the "RealSite" software as developed by Harris Corporation of Melbourne, Fla., to be used to assist in calculating the mobile location. The present invention is also advantageous because it allows use of the mobile transmitting unit for calibrating the clocks of two different receivers at two different receive sites, even though the location of the unit may be unknown. Two receivers could be used simultaneously to determine the geolocation of a mobile transmitting unit, even when multipath is present, as will be described.

The present invention is advantageous over radio fingerprinting, which has limitations and drawbacks. The mobile is always presumed to be at one of the grid points and not at an intermediate location between grid points. The elevation of a mobile also changes, of course, such as in a building, resulting in errors in the location estimate. The accuracy depends on long transmissions and the motion of the mobile. The use of narrow band signals can also limit the ability to discriminate paths and the extensive calibration is required to generate a fingerprint grid database. The embedded mobiles will also have different fingerprints as compared to exposed units.

Figure 2:
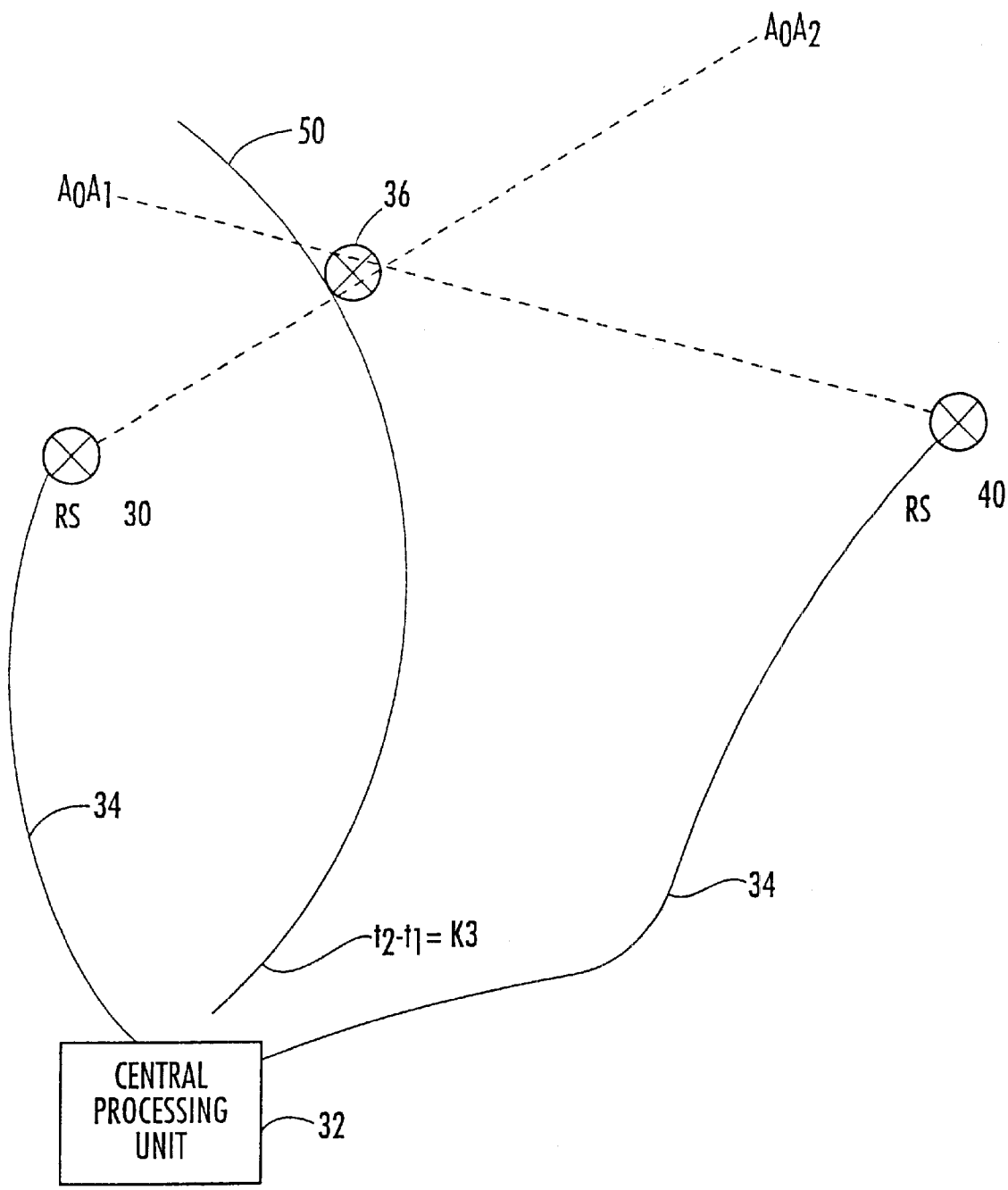

FIGS. 1 and 2 illustrate a basic geolocation system and method using an Angle of Arrival (AOA) and Time of Arrival (TOA) system, such as disclosed in the incorporated by reference '584 patent to Otto, assigned to Harris Corporation of Melbourne, Fla.

With reference to FIG. 1, the geolocation system uses plural fixed receive sites 30, each connected to a central processing unit 32 through conventional communication links 34. A target unit (or unit to be geolocated such as a mobile transmitting unit) 36 transmits a radio frequency signal, which may be an RF signal, an electromagnetic signal, or various types, to plural of the receiving stations.

In operation, the receive sites (or "receiving stations") 30 each receive the signal from the target unit 36 and send a communication concerning that signal reception to the central processing unit 32. Depending upon the structure of the system, the central processing unit 32 may use the Angle of Arrivals of the signal at the receive sites 30 or the Times of Arrival of the signal at the receive sites 30 or other conventional means to determine the geolocation of the target unit 36. With a proper system design, the central processing system 32 can simultaneously determine the geolocation of several target units 30 located within the receiving range of plural of the receiving stations 30.

With reference to FIG. 2, the system requires only two receiving stations RS 30 and RS 40 to determine the geolocation of a target unit 36. Each receiving location 30 receives a signal from the target unit 36 and determines both the Angle of Arrival and the Time of Arrival of the signal, which is provided, in turn, to the central processing unit 32 through conventional communications links 34. At the central processing unit 32, the difference in Time of Arrival information between two stations may be used to compute a locus of points along a curve 50 at which the target unit 36 may exist (i.e., the locus of points from which a signal would have the determined Time Difference of Arrival between the given two receiving stations 30). The precise point along the curve 50 at which the target unit 36 is determined to be located is obtained from the intersection of the curve 50 with the bearing lines (from the Angles of Arrival) AOA1, AOA2 from either one of the receiving stations, RS30 or RS40.

Ideally, the curve 50 and the bearing lines AOA1 and AOA2 all intersect at a single point coincident with the location of the target unit 36. In practice, however, errors in the TOA measurements will displace the curve and/or errors in the AOA measurements will displace one or both of the bearing lines such that multiple points of intersection occur, as is shown, thus leading to uncertainty in the location of the mobile unit.

In this type of system in which multiple receiving sites are needed to provide geolocating (and/or communications) coverage throughout a geographic area, such as in a low power personal communication systems, which cover a wide geographic area, only two receiving stations are required for contact with a target unit at any time in order to provide complete geolocating coverage. If in a given system, the signals from a target unit are received at more than two receiving stations, the processing unit can combine the bearing lines and the curves using any vectora combination scheme known to those skilled in the art.

Depending upon the local terrain conditions and other factors, the central processing unit 32 may: weight the signals from some receiving sites more heavily than others; weight the signals in proportion to a metric of signal quality such as signal-to-noise ratio of the received signals; weight more heavily the positions determined from receiving stations closer to the determined location of the target unit; and/or eliminate some of the bearing lines and/or curves for outlying estimates, and thus, weighting more heavily the curves determined from the TDOA determinations. The central processing unit could determine the geolocation of the target unit using a moment of inertia calculation based on the weighted estimates of position. Indeed, the central processing unit may determine the geolocation of the target unit using a moment of inertia calculation based on the weighted estimates of position.

There now follows a general overall description of the present invention, followed by a detailed description relative to drawing FIGS. 3–13. The present invention is advantageous and determines the location of a transmitter. A transmitter to be located transmits a signal and a receiver receives the signal from a transmitter and measures the Time of Arrival of plural of the multiple path signals from a transmission. One or more natural or manmade objects reflect and/or refract portions of a signal from the transmitter toward the receiver.

A database could be used to contain locations of, or information that may be used to calculate the locations of, the receiver and one or more, but necessarily all, of the natural or manmade objects. A processor is operative with the receiver and the database and estimates the location of the transmitter or determines a set of points representing potential locations of the transmitter. This can be accomplished by either selecting one object, the location of which is either stored in the database or may be determined from information in the database, as a proxy receiver, or selecting plural objects, the locations of which are either stored in the database or may be determined from information stored in the database, as plural proxy receivers.

The location of each proxy receiver is determined from information in the database. The location of the receiver can be determined from information stored in the database and then calculated with a straight-line signal propagation time from each proxy receiver to the receiver. The Time of Arrival of the signal at each proxy receiver can be calculated by subtracting the proxy-receiver-to-receiver signal propagation time for that proxy receiver from the estimated Time of Arrival at the receiver of that path estimated to have been reflected or refracted from the proxy receiver.

One or more sets of points can be generated with each such set representing potential locations of the transmitter corresponding to the difference in Time of Arrival of the signal and a proxy receiver from the Time of Arrival of the signal at either another proxy signal or the receiver.

A source or sources of additional information are operatively connected to the processor and may be necessary or desirable for use by the processor by (a) selecting a proxy receiver or plural receivers, (b) as additional inputs to a multilateration calculation or (c) determining the waiting to be applied to points or sets of points and combining them to produce a refined set of points.

The transmitter can be a mobile transmitting unit and the receiver can be a mobile receiver. The transmitter can also be located indoors, as well as the receiver. At least one proxy receiver could also be indoors.

The signal could be one of an electromagnetic signal, a radio frequency signal, an optical signal, or acoustical signal. The signal can be generated by or at the transmitter, and can be modulated in accordance with any combination of parameters such as, but not limited to, the identification number of the transmitter, data stored at the transmitter, or the status of sensors or switches at the transmitter. The transmitter can also transmit the signal in response to any combination of states of an internal timer, motion detector, or other sensor or algorithm. The signal can also be transmitted in response to an external command or event such as, but not limited to, a button or switch closure, or the reception or a trigger or command signal. The signal could be the retransmission of a signal received at the transmitter and modified in any combination of ways such as, but not limited to, amplitude modulation, phase modulation, frequency translation, time shifting, spectral inversion, polarization or any other such transformation, or modulation as may be used by those skilled in the art. It can also be modified in accordance with any parameter such as, but not limited to, the identification number of the transmitter, data stored at the transmitter or the status of sensors or switches at the transmitter.

The transmitted signal can be a conventional communication system signal, but not limited to, cellular telephone, specialized mobile radio, mobile data or personal communications. This transmitted signal can also have a band width such as, but not limited to, narrow band, wideband, composed of portions with band widths or composed of portions in non-contiguous frequency bands. The signal can also be a spread spectrum signal in any modulation format or combination of modulation formats such as, but not limited to, direct sequence, frequency hopping, non-linear frequency, linear frequency (chirp), co-chip key in, code position, pulse position or impulse. It can include a straight-line path signal from the transmitter to the receiver and can include a straight-line path signal from the transmitter to the receiver.

The at least one object can include a natural landmark or earth elevation, as a proxy receiver, or another man-made structure such as a building, portion or a building, water tower, portion or a water tower, communications or utility power pole or portions of a communications or utility power pole.

When a database is used with the present invention, it can contain two-dimensional or three-dimensional location data. It also can contain information that may be used to calculate two-dimensional or three-dimensional locations of an object. The database can include a digitized map, digitized imagery, electromagnetic imagery, radio frequency imagery, optical imagery or acoustical imagery. The imagery can be the same frequency band as the transmitted signal or can be in a frequency band different from the transmitted signal.

In another aspect of the present invention, as noted before, there may be additional information or there may not be additional information for processing. This source of additional information could be the receiver, the Angle of Arrival at the receiver or the earliest arriving signal path, such as the azimuth and elevation. The additional information could include the Time of Arrival at the receiver of the earliest arriving signal path or the Angle of Arrival at the receiver of a signal path estimated by the processor to have been reflected or refracted by a proxy receiver. This Angle of Arrival can include the azimuth and elevation.

The additional information can also include the Angles of Arrival at the receiver of plural signal paths estimated by the processor to have been reflected or refracted by plural proxy receivers. The Angle of Arrival of one or more of the plural reflected or refracted signal paths can be both azimuth and elevation. The additional information can also include, in any combination, parameters of the received signal or portions thereof, such as, but not limited to: signal strength, Angle of Arrival, Time of Arrival, multipath profile or roundtrip signal flight time.

The source of additional information could also be the database. This additional information could include information collected from prior transmission by the transmitter. The additional information can include prior estimates of transmitter location in two or three dimensions. There could also be plural sources of the additional information.

The processor can determine a set of potential locations of the transmitter corresponding to the difference in Time of Arrival of a signal at a proxy receiver and the Time of Arrival of one other signal path at the receiver. This other signal path can be the earliest arriving signal path at the receiver. The processor can also determine a set of potential locations of the transmitter corresponding to the difference in Time of Arrival of a signal path at a first proxy receiver and the Time of Arrival of a signal path at the second proxy receiver. The processor can determine a set of potential locations of the transmitter corresponding to the intersection of (a) the set of potential locations of the transmitter corresponding to the difference in Time of Arrival of a signal path at a proxy receiver as determined by the Time of Arrival of the signal path reflected or refracted by that proxy receiver and the Time of Arrival of one other signal path at the receiver with (b) a set of potential locations of the transmitter corresponding to the Angle of Arrival of the other path at the receiver.

This other signal path can be the earliest arriving path at the receiver and the Angle of Arrival can include both azimuth and elevation.

The processor can also determine a set of potential locations of the transmitter that is the intersection of (a) the set of potential locations of the transmitter corresponding to the difference in Time of Arrival of a first signal path at a first proxy receiver as determined by the receiver and a second signal path at a second proxy receiver as determined by the receiver with (b) the set of potential locations of the transmitter corresponding to the Angle of Arrival at the receiver of a third signal path.

The third signal path can be the earliest arriving signal path at the receiver. The Angle of Arrival can be determined in both azimuth and elevation. The processor can determine a refined set of potential locations of the transmitter by waiting and combining in any combination: points within a set of points; plural sets of points; and sets of points derived from previous transmissions for previously-refined sets of points.

The combined points can include the intersection of plural sets of points or one or more of the points weighted more heavily than others of the points. A refined set of points is determined by vector combination of points in two dimensions. A refined set of points is determined by vector combination of points in three dimensions.

The system can include a plurality of receivers for receiving the signal, each of which measures the Time of Arrival of plural of the multipath signals from a transmission. The plurality of the receivers includes two receivers and the processor determines a set of potential locations of the transmitter corresponding to the difference in Time of Arrival of a signal at a first proxy receiver as determined from the Time of Arrival of the signal reflected or refracted by the first proxy receiver at a first receiver and the Time of Arrival of the signal at a second proxy receiver as determined by the Time of Arrival of the signal reflected or refracted by the second proxy receiver at a second receiver.

The processor can determine a set of potential locations of the transmitter corresponding to the difference in Time of Arrival of a signal at a proxy receiver as determined from the Time of Arrival of the signal path reflected or refracted by that proxy receiver at a first receiver and the Time of Arrival of a signal at a second receiver. This second receiver can be the Time of Arrival of the earliest arriving signal path at the second receiver. The earliest arriving signal path at the second receiver is the straight-line path from the transmitter to the second receiver.

The processor can determine a refined set of potential locations of the transmitter by combining plural sets of potential locations of the transmitter. This set of combined points can be an intersection of plural sets of points and can be determined by a vector combination of weighted sets of points in two dimensions. The combined set of points can be determined by vector combination of weighted sets of points in three dimensions.

The receiver can receive a signal from a transmitter and measure the Time of Arrival of plural of the multiple path signals with a signal channel receiver. It can receive a signal from a transmitter and measure the Times of Arrival of plural of the multiple path signals in a plural channel receiver. One of the plural channels can be operative with a directive antennae pointed in a radial direction along which lies at least one object that may be selected as a proxy receiver. There can be plural directive antennas, each of which is pointed in a radial direction along which lies at least one object that may be selected as a proxy receiver and each of which is operative with a separate channel of the receiver.

This directive antennae is a sector of a multiple sector antennae and can be a conventional communications system such as, but not limited to: mobile telephone, specialized mobile radio, or a mobile data. The plural, but necessarily all, channels of a receiver are each operative with one or more elements of a plural element antennae such that those plural channels include a phased array receiver and can include a linear array or two-dimensional array that is directive substantially in a direction parallel to the plane of the array. It can also be directive substantially in a direction perpendicular to the plane of the array. The plural elements can be operative with the plural channels and include a phased array receiver that includes a three-dimensional array. The plural elements can be operative with the plural channels and include a phased array receiver that are of the same polarization. The receiver can also be plural co-located receivers with substantially co-located antennas, including a plural channel receiver that is a phased array receiver.

The Time of Arrival of a signal path can be measured on the linear or a vector combination of weighted signals from plural receiver channels. The weights for the channels can be chosen to reduce or null signals from paths other than the path for which the Time of Arrival is measured. Polarization of the antennae elements can feed some of the channels that differ from the polarization of the antennae elements feeding other of the channels. This other information can include information about or gathered by the transmitter such as, but not limited to: configuration (e.g., body worn, vehicle mounted, attached to large asset, attached to hand-carried asset); elevation; barometric pressure; temperature; location (e.g., outdoors, indoors, on road); or velocity. The other information is transmitted by the transmitting unit.

The method and system for calibrating a wireless location system such as receivers used for locating a transmitter is advantageously set forth. A signal can be transmitted from an unknown location. A signal is received and measured at each of a first and second receiver. An error value is determined based on the difference between an expected difference between parameter values and the actual difference between measured parameter values such that the expected difference is determined using information from the database and other sources.

The error value is used to apply corrections to the wireless location system equipment to minimize the errors in subsequent measurements and/or apply corrections to any prior, concurrent or subsequent measurements of the parameter. Throughout this description, the proxy reference transmitter can be a natural or man-made object as described before. It can also be described as the proxy reference receiver or proxy receiver that receives and reflects or refracts signals, thus acting similar to a transmitter. Any error value can also be based on the difference between an expected frequency difference of arrival and the actual frequency difference of arrival.

Figure 3:
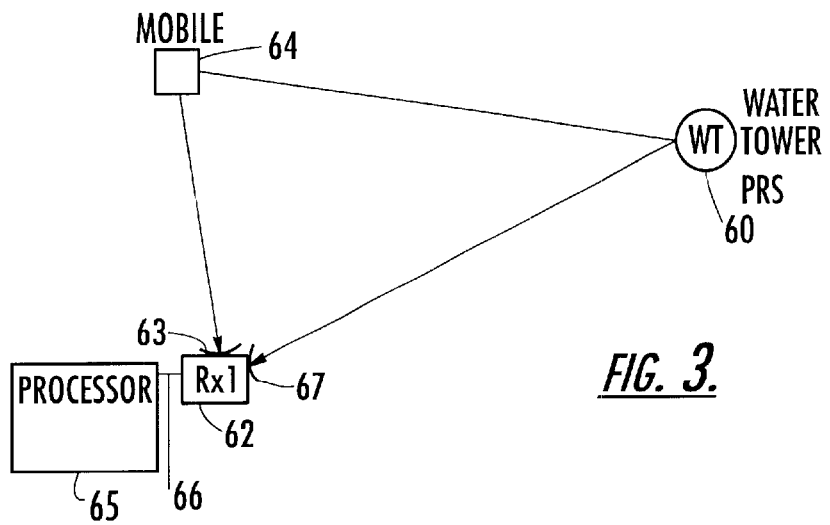
FIG. 3 is a diagram showing how a proxy receive site having a proxy receiver, such as a water tower, can be established for determining the location of a mobile unit using only one receive site.
Figure 4:
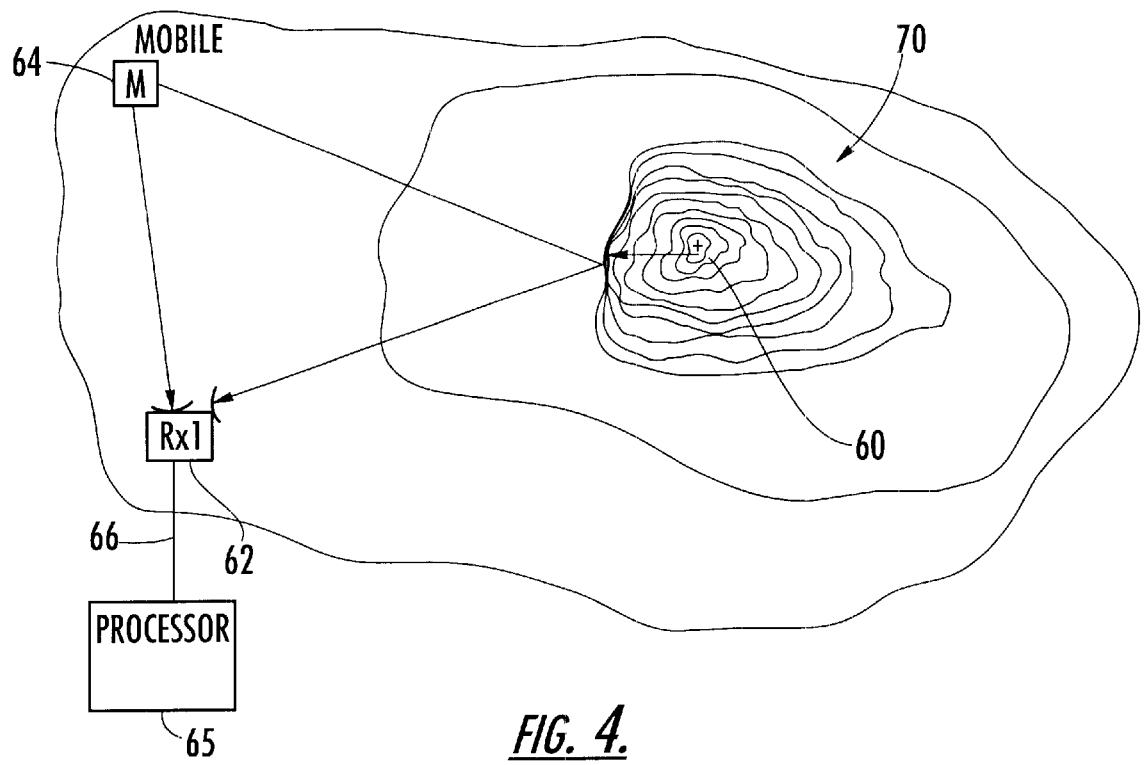
FIG. 4 illustrates a diagram similar to FIG. 3, but showing the proxy receiver as a natural object, such as a hill.

FIG. 3 illustrates a first aspect of the present invention, wherein the processor has selected a proxy receiver 60 located at a proxy receive site (PRS) which is believed to be a reflector/refractor of signals from the transmitter to the receiver, as in a typical multipath example. The Time of Arrival for the proxy receiver equals the Time of Arrival of the reflected or refracted path at the receiver site (RS) minus the proxy receiver site to receiver site propagation time. Although a water tower is the illustrated proxy receiver 60, it should be understood that a proxy receiver located at a proxy receiver site can be any type of reflector or refractor such as the flat, reflective side of a building, the edge of a building, a geographic landmark such as a large hillside, a tree in the middle of a prairie, a communications or utility tower, bridge or other reflector/refractor objects as suggested and known by those skilled in the art.

In the specific illustrated aspect shown in FIG. 3, the receive site (RS) 62 includes a receiver ($R_1$) and includes an omnidirectional antenna 63 that receives a signal from the mobile transmitting unit 64. The associated processor 65 is operatively connected to the receiver and determines the Time of Arrival of the earliest arriving path signal incident on the omnidirectional antenna using standard processing algorithms known to those skilled in the art. The computer or other processor of the type known to those skilled in the art 65 could be located at the receive site or connected via communication lines 66 at a distance from the receive site. In one aspect of the invention, a unidirectional antennae 67 can be pointed directly at the water tower 60 and positioned at the receiver site and also operatively connected to the receiver. The receiver determines the Time of Arrival of the reflected or refracted path signal incident upon the directional antenna. The processor 65 determines the Time Difference of Arrival between the line of sight signal transmitted to the receive site from the mobile transmitting unit and the reflection from the water tower, i.e., the proxy receiver 62. This value is determined based upon the known location of the water tower as stored in the database.

Figure 5:
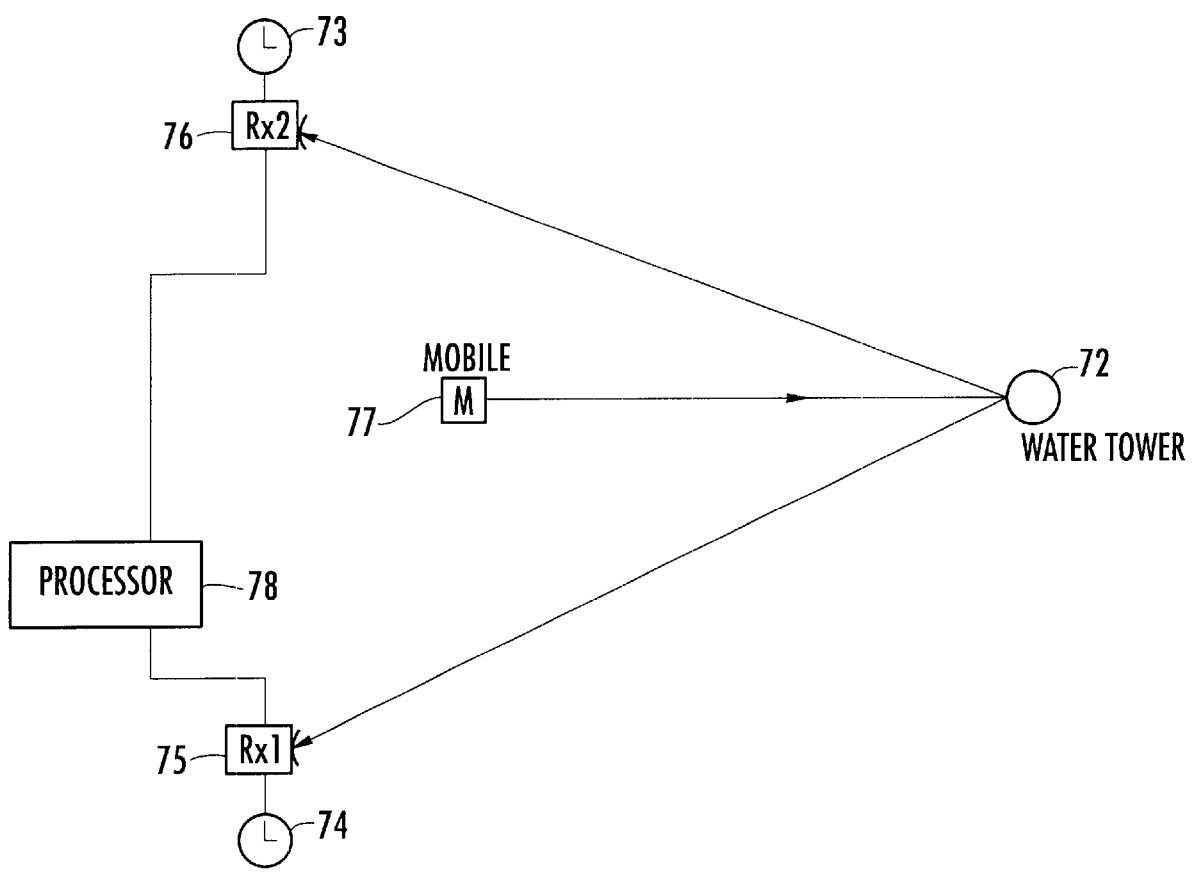
FIG. 5 illustrates how a proxy receiver can be used for calibrating the clocks of first and second receive sites.

FIG. 5 illustrates the use of a proxy receiver 72, such as a water tower, for calibrating respective clocks 73, 74 at respective receiver 1 (75) and a receiver 2 (76). Calibrated clocks can be critically important in some applications for determining the location of mobile units, especially when multipath considerations are taken into account, as in the present invention. Even if the mobile transmitting unit 77 is at an unknown location, this unit can transmit to the proxy receive site from that unknown location against the reflector, acting as a proxy receiver 72, i.e., the water tower, in the present example. Each receive site, such as the illustrated receiver 1 and receiver 2, receive the reflection off the water tower acting as the proxy receiver. The receive sites are at fixed, known locations and the distance and angle to the water tower are known. A central processor 78 is operative with both receivers could receive the Time of Arrival and Angle of Arrival information from the two receivers. Through appropriate algorithms and calculations, the differences are established, and the offset from the two clocks 73, 74 can be removed using standard processing algorithms, as known to those skilled in the art. This calibration is advantageous over prior art techniques where known transmitters at known locations are used to transmit a signal.

Figure 6:
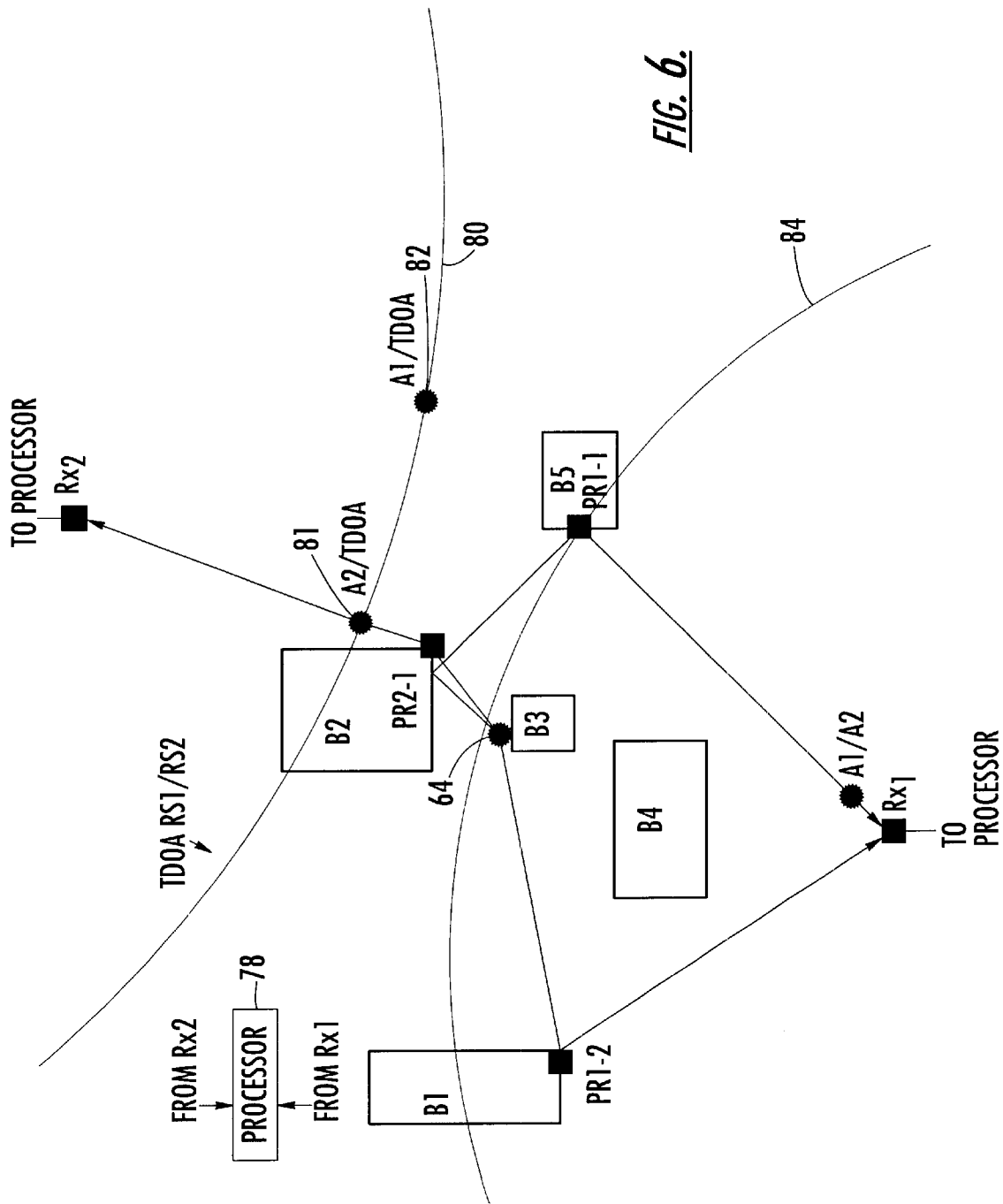
FIG. 6 is a diagram illustrating a multipath situation caused by various buildings, illustrating the error that occurs when the hyperbola and locus of points that are established if the proxy receivers are considered to be direct line of sight reflectors.

FIG. 6 illustrates a situation where multipath is present such as in an urban environment where various buildings, B1–B5 for example, are present. A transmitter, such as a mobile transmitting unit 64, is located behind building B3, which is also positioned central to the four other buildings B1, B2, B4 and B5. Receiver 1 ($Rx_1$) is located south of the buildings and receiver 2 ($Rx_2$) is located north of the buildings. A processor is operative with the receivers.

As illustrated, no direct line of sight communications are made from the transmitter, e.g. mobile transmitting unit 64 to receiver 1 ($Rx_1$) or receiver 2 ($Rx_2$). Instead, the first receiver ($Rx_1$) receives reflected first and second arriving signals (PR1-1, PR1-2) from buildings B1 and B5, while receiver 2 ($Rx_2$) receives a signal as a first arriving path from building 2, which could be a as proxy receiver. Thus, the Angle of each transmission from a proxy receiver formed by the respective buildings and the signal and its Time of Arrival can be determined. If the time difference between the arrival of the signal at the second receiver ($Rx_2$) and the earliest arriving of the two signals at the first receiver ($Rx_1$) is taken, then the hyperbola line drawn at 80 is formed. If the system took the Time Difference of Arrival of the earliest path at each site ($Rx_1$ or $Rx_2$), and the angle from one or the other of the sites, and the two locations are calculated, neither would be correct as illustrated by the two stars 81, 82 shown at A2/TDOA and A1/TDOA. The first star 81 shows angle two with the Time Difference of Arrival and the second star 82 shows angle one and the Time Difference of Arrival. The hyperbola line drawn at 84 illustrates the correct hyperbola if there were only direct line of sight communications. It is evident that there are three sites PR1-2, PR2-2, and PR1-1 showing squares for the proxy receivers and the curves are calculated with this ambiguous solution.

Figure 7:
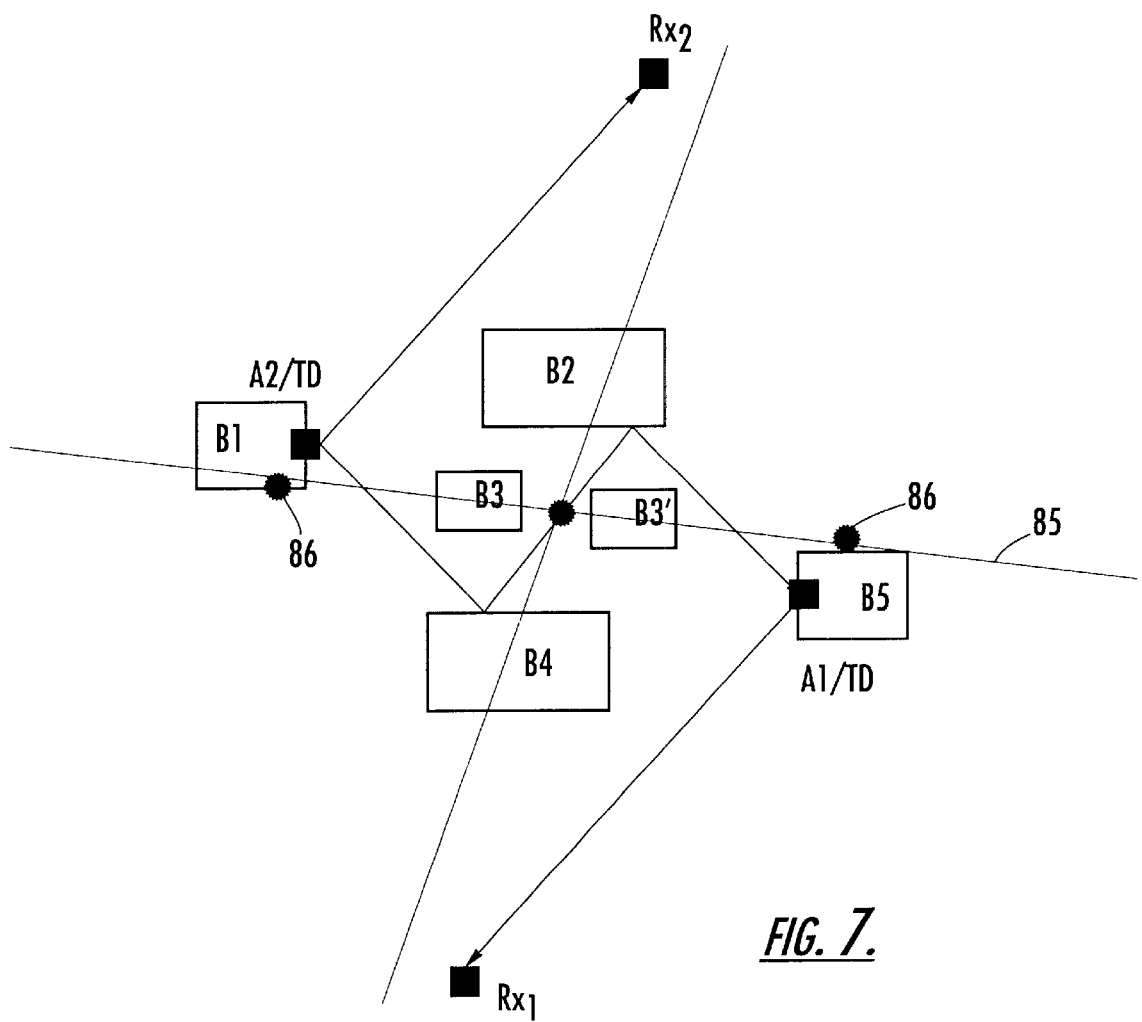
FIG. 7 illustrates the locus of points and error that could occur when only an Angle of Arrival analysis is used with proxy receivers.

FIG. 7 illustrates a similar situation where an improper line 85 forming a potential locus of points is established when mobile transmitting unit 64 is located between buildings B3, B3', and only Angle of Arrival considerations are used with line of sight values AS2/TD and A1/TD. Improper locations are shown by stars 86 are based on the Time Difference of Arrival calculations.

In accordance with the present invention, the location, i.e., the latitude and longitude, of a reflector/refractor located at the proxy receive site and forming a proxy receiver along each of the arriving paths is determined via a look-up table or feature extraction from a geographic image database, such as the software "RealSite," as developed by Harris Corporation of Melbourne, Fla. The geographic database could include data relating to the natural and man-made features in a specific area, including data about buildings and natural land formations such as hills.

For example, a database could include information about a specific area, from where a signal emanates, includes a tall building or water tower, being a passive reflector of radio or other signals, and thus act as a proxy receiver. A look-up table could have similar data and the system processor would interrogate and determine from the look-up table the type of buildings, natural features, etc. from where a signal emanates to determine what features could be proxy receivers. The use of the geographic database with a look-up table or the use of feature extraction software is advantageous and allows the system to determine if a direct line of sight path or a reflected and/or refracted path is a source of the signal.

Figure 8:
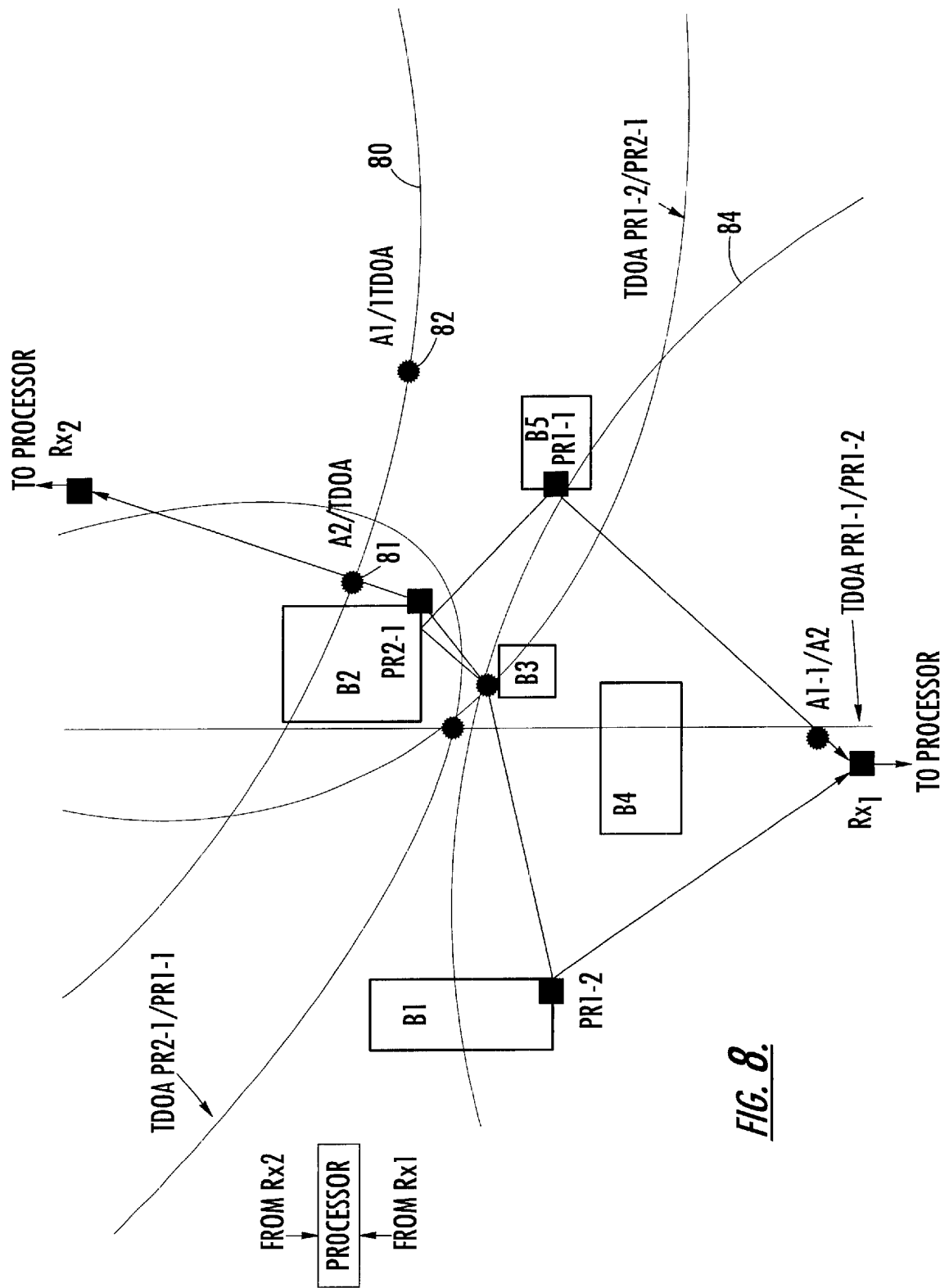
FIG. 8 is a diagram similar to FIG. 7, but illustrating the locus of points that are developed based on the system and method of the present invention, such that the location of a mobile unit can be established.

The system could use the feature extraction software or query the look-up table to determine that the layout shown in FIGS. 6 and 8, which includes five buildings, forming the reflections and refractions as illustrated by the signal lines among the buildings. For the example shown in FIGS. 6 and 8, a two-dimensional database would be required. It is possible, however, to also use a three-dimensional database in order to take into consideration elevation concerns.

In this type of system, where knowledge of reflected/refracted and line of sight signals could be determined by feature extraction, or the look-up table used, the location estimate could be calculated using weighted Time Difference of Arrival curves and Angle of Arrival bearings. The weights may depend on the number of parameters including the number of receive sites that receive a signal, such as receiver 1 ($Rx_1$) and receiver 2 ($Rx_2$), as illustrated. Other weights could depend on the number of paths received at a site (or in total), as well as the geometry, i.e., relative locations of the receive sites ($Rx_1$ and $Rx_2$), the proxy receive sites (PRS) and the mobile transmitting unit 64. An estimated signal to noise (S/N) ratio for each path and the location estimates from prior transmissions could also be used. The location estimate could also be dependent on the weights from the Angle of Arrival and Time of Arrival estimates.

The process may be iterative. For example, if a mobile unit 64 transmits a signal that is received at two receive sites, the system could calculate three estimates of the location using the receive site Time of Arrival and Angle of Arrival. For example, the following three calculations could be used: 1) the Angle of Arrival of receive site 1 and the Angle of Arrival of receive site 2; 2) the Angle of Arrival from receive site 1 and the Time Difference of Arrival of receive site 2 minus receive site 2; and 3) the Angle of Arrival for receive site 2 and Time Difference of Arrival for receive site 1 minus receive site 2.

If the variation between the estimate is small, then a weighted combination could be used. If the variation is large, proxy receive sites could be substituted for one or both receive sites and the system could reiterate the calculations. Plural proxy receivers could be used for a single Angle of Arrival in this iterative process. The image data obtained from feature extraction software, such as from RealSite, could be used to validate an answer.

For purposes of illustration, a brief description of an example of a feature extraction program that could be used with the present invention, such as RealSite, is set forth. Naturally, many different types of feature extraction software are available to one skilled in the art, and can be used in the present invention to determine the various features that could act as passive reflectors or refractors and be proxy receivers. Although the present example will be described relative to texture software, radio frequency reflective values could also be used instead of texture values as reflected optical effects. The database could also be used with two-dimensional or three-dimensional feature imaging. Optical reflectivity can be used for finding building plane surfaces and building edges, which aid in determining the location of proxy receivers.

Further details of a texture mapping system used for creating three-dimensional urban models is disclosed in U.S. patent application Ser. No. 09/652,118, assigned to the present assignee, the disclosure which is hereby incorporated by reference in its entirety. For purposes of description, a high level review of feature extraction using RealSite is first set forth. This type of feature extraction software can be used to validate results and find the natural and man-made proxy receivers and can be used in two-dimensional and three-dimensional modes.

RealSite allows the creation of three-dimensional models in texture mapping systems and extends the technology used for terrain texturing to building texture by applying clip mapping technology to urban scenes. It can be used to determine optical reflectivity values and even radio frequency reflectivity for determining proxy receivers and determining the latitude and longitude of such proxy sites.

It is possible to construct a single image of a building from many images that are required to paint all the sites. Building site images can fit into a composite image of minimum dimension, including rotations and intelligent arrangements. Any associated building vertex texture coordinates can be scaled and translated to match new composite images. The building images can be arranged in a large "clip map" image, preserving the horizontal relationships of the buildings. If the horizontal relationships cannot be accurately preserved, a "clip grid" middle layer can be constructed, which can be used by the display software to accurately determine the clip map center.

At its highest level, the system creates a packed rectangle of textures for each of a plurality of three-dimensional objects corresponding to buildings to be modeled for a geographic site. The system spatially arranges the packed rectangle of textures in a correct position within a site model clip map image. The texture mapping system can be used with a computer graphics program run on a host or client computer having an OpenGL application programming interface. The location of a clip center with respect to a particular x,y location for the site model clip map image can be determined by looking up values within a look-up table, which can be built by interrogating the vertices of all building polygon faces for corresponding texture coordinates. Each texture coordinate can be inserted into the look-up table based on the corresponding polygon face vertex coordinate.

In these types of systems, the graphics hardware architecture could be hidden by the graphics API (Application Programming Interface). Although different programming interfaces could be used, a preferred application programming interface is an industry standard API such as OpenGL, which provides a common interface to graphics functionality on a variety of hardware platforms. It also provides a uniform interface to the texture mapping capability supported by the system architecture.

OpenGL allows a texture map to be represented as a rectangular pixel array with power-of-two dimensions, i.e., $2^m \times 2^n$. To increase rendering speed, some graphics accelerators use pre-computed reduced resolution versions of the texture map to speed up the interpolation between sampled pixels. The reduced resolution image pyramid layers are referred to as MIPmaps by those skilled in the art. MIPmaps increase the amount of storage each texture occupies by 33%.

OpenGL can automatically compute the MIPmaps for a texture, or they can be supplied by the application. When a textured polygon is rendered, OpenGL loads the texture and its MIPmap pyramid into the texture cache. This can be very inefficient if the polygon has a large texture, but happens to be far away in the current view such that it only occupies a few pixels on the screen. This is especially applicable when there are many such polygons.

Further details of OpenGL programming are found in Neider, Davis and Woo, *OpenGL Programming Guide*, Addison-Wesley, Reading, Mass., 1993, Chapter 9, the *Guide disclosure* which is hereby incorporated by reference in its entirety.

Clip texturing can also be used, which improves rendering performance by reducing the demands on any limited texture cache. Clip texturing can avoid the size limitations that limit normal MIPmaps by clipping the size of each level of a MIPmap texture to a fixed area clip region.

Further details for programming and using clip texturing can be found in Silicon Graphics, *IRIS Performer Programmer's Guide*, Silicon Graphics, Chapter 10: Clip Textures, the Programmer's Guide, which is hereby incorporated by reference in its entirety.

*IRIS Performer* is a three-dimensional graphics and visual simulation application programming interface that lies on top of OpenGL. It provides support for clip texturing that explicitly manipulates the underlying OpenGL texture mapping mechanism to achieve optimization. It also takes advantage of special hardware extensions on some platforms. Typically, the extensions are accessible through OpenGL as platform specific (non-portable) features.

In particular, IRIS Performer allows an application to specify the size of the clip region, and move the clip region center. IRIS Performer also efficiently manages any multi-level paging of texture data from slower secondary storage to system RAM to the texture cache as the application adjusts the clip center.

Preparing a clip texture for a terrain surface (DEM) and applying it can be a straightforward software routine in texture mapping applications, as known to those skilled in the art. An image or an image mosaic is orthorectified and projected onto the terrain elevation surface. This single, potentially very large, texture is contiguous and maps monotonically onto the elevation surface with a simple vertical projection.

Clip texturing an urban model, however, is less straightforward of a software application. Orthorectified imagery does not always map onto vertical building faces properly. There is no projection direction that will map all the building faces. The building textures comprise a set of non-contiguous images that cannot easily be combined into a monotonic contiguous mosaic. This problem is especially apparent in an urban model having a number of three-dimensional objects, typically representing buildings and similar vertical structures. It has been found that it is not necessary to combine contiguous images into a monotonic contiguous mosaic. It has been found that sufficient results are achieved by arranging the individual face textures so that spatial locality is maintained.

Figure 9:
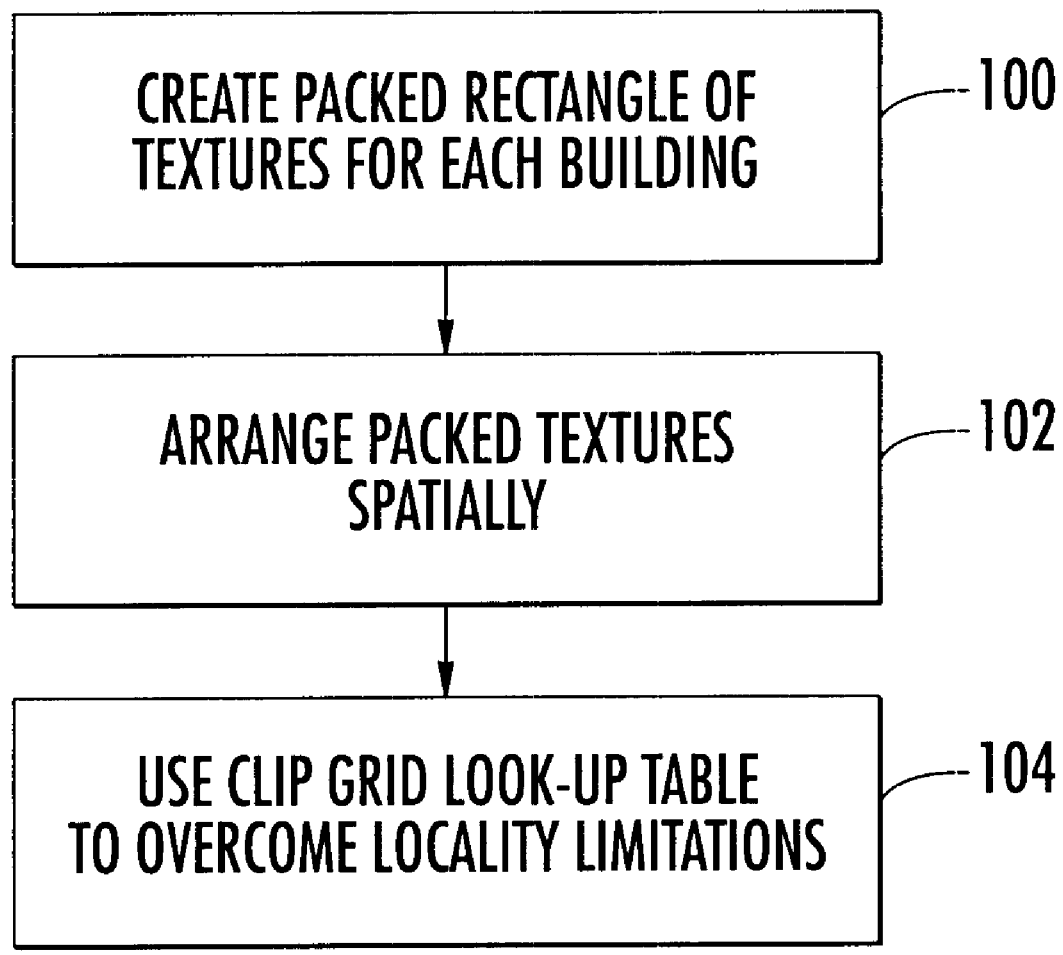
FIGS. 9 and 10 illustrate flow charts for an image database routine that could be used with the present invention.

FIG. 9 illustrates a high level flow chart illustrating basic aspects of a texture application software model, such as could be used in conjunction with the present invention as related to geolocating a mobile transmitting unit. The system creates a packed rectangle of textures for each building (block 100). The program assumes that the locality is high enough in this region that the actual arrangement does not matter. The packed textures are arranged spatially (block 102). The spatial arrangement matters at this point, and there are some trade-offs between rearranging things and the clip region size. A clip grid look-up table, however, is used to overcome some of the locality limitations (block 104), as explained in detail below.

Figure 10:
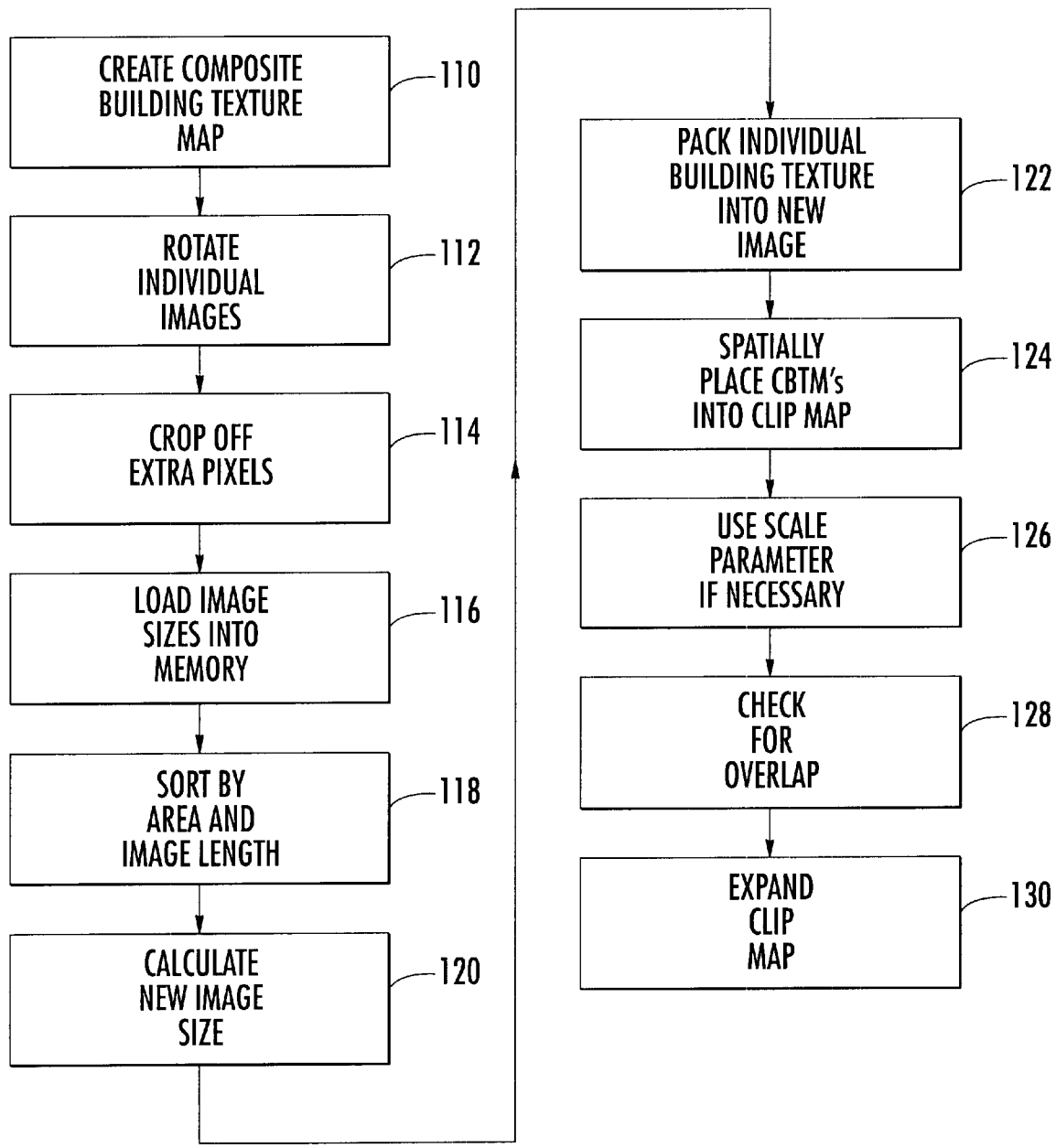

Referring now to FIG. 10, a more detailed flow chart sets forth the sequence of steps. A composite building texture map (CBTM) is created (block 110). Because of tiling strategies used later in a site model clip mapping process, all images that are used to texture one building are collected from different viewpoints and are packed into a single rectangular composite building texture map. To help reduce the area of pixels included in the CBTM, individual images (and texture map coordinates) are rotated (block 112) to minimize the rectangular area inside the texture map actually supporting textured polygons. After rotation, extra pixels outside the rectangular footprint are cropped off (block 114).

Once the individual images are pre-processed, image sizes for each contributing image are loaded into memory (block 116). These dimensions are sorted by area and image length (block 118). A new image size having the smallest area, with the smallest perimeter, is calculated, which will contain all the building's individual textures (block 120). The individual building textures are efficiently packed into the new image by tiling them alternately from left to right and vice versa, such that the unused space in the square is minimized (block 122).

Figure 11:
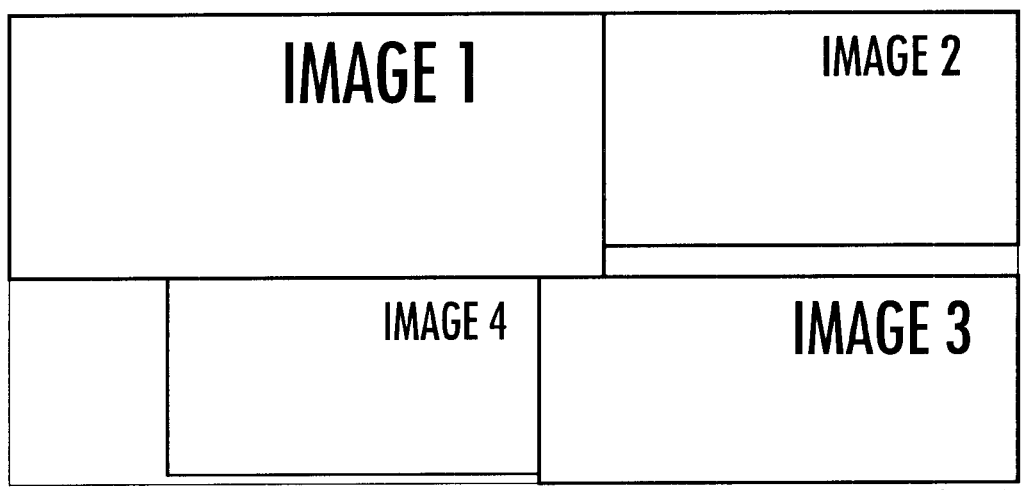
FIG. 11 is a layout of individual images of a building and texture model that could be used with the present invention.

FIG. 11 illustrates an example of a layout showing individual images of a building in the composite building texture map. This is accomplished by an exhaustive search as described to calculate the smallest image dimensions describing each building.

A site model clip map image is next created. Because each composite building texture map (CBTM) is as small as possible, placing each one spatially correct in a large clip map is realizable. Initially, each composite building texture map is placed in its correct spatial position in a large site model clip map (block 124). A scale parameter is used to initially space buildings at further distances from each other while maintaining relative spatial relations (block 126). Then each composite building texture map is checked for overlap against the other composite building texture maps in the site model clip map (block 128). The site model clip map is expanded from top right to bottom left until no overlap remains (block 130). For models with tall buildings, a larger positive scale parameter may be used to allow for the increased likelihood of overlap. All texture map coordinates are scaled and translated to their new positions in the site model clip map image.

Figure 12:
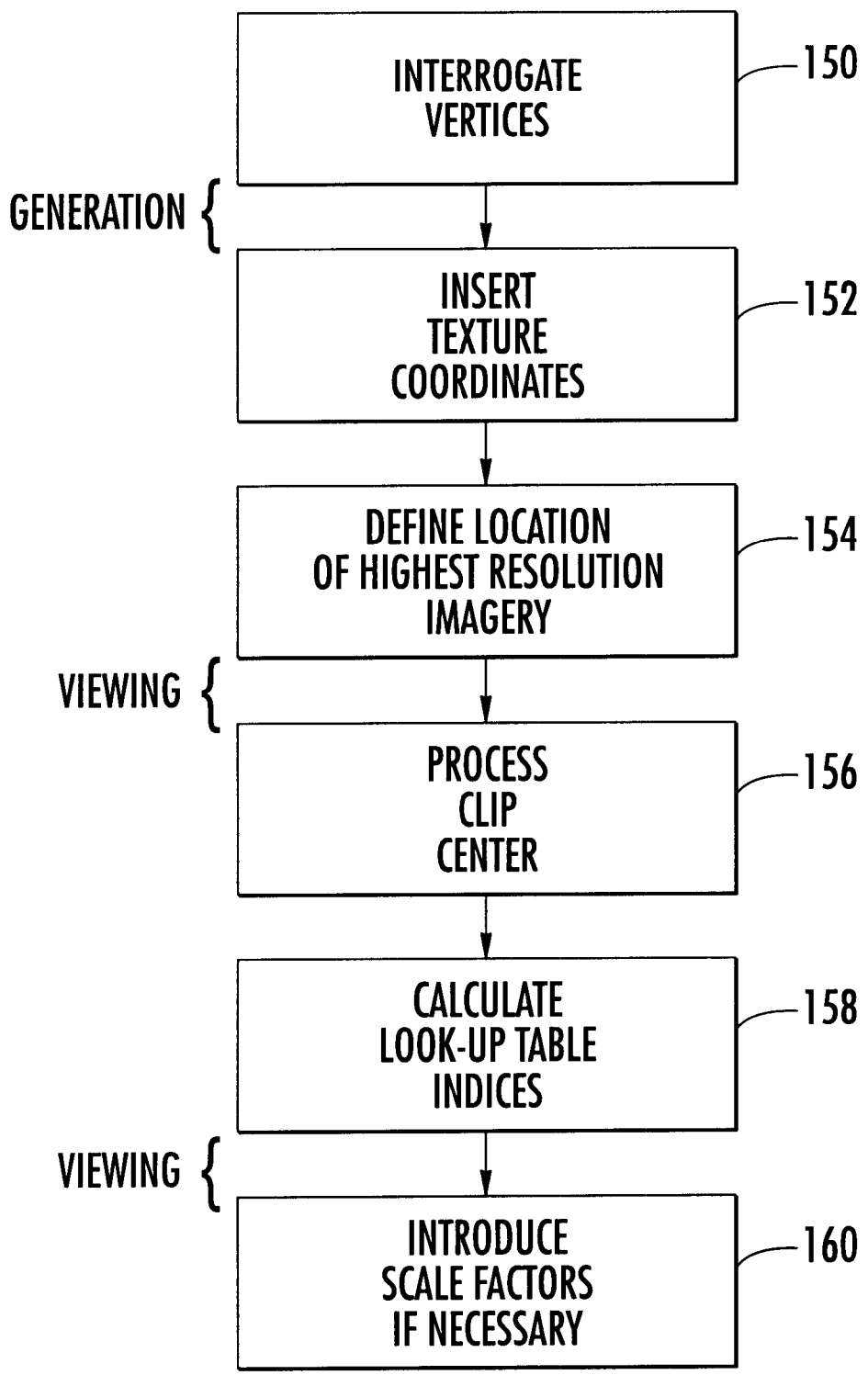
FIG. 12 is another flow chart showing the type of process that could be used with an image database routine shown in FIGS. 9 and 10.

Referring now to FIG. 12, a flow chart illustrates the basic operation that can be used to process and display building clip textures correctly. A clip map clip grid look-up table is used to overcome these limitations and pinpoint the exact location of where the clip center optimally should be located with respect to a particular x,y location. To build the table, the vertices of all the building polygon faces are interrogated for their corresponding texture coordinates (block 150). Each texture coordinate is inserted into a look-up table based on its corresponding polygon face vertex coordinates (block 152).

A clip center or point in the clip map is used to define the location of the highest resolution imagery within the clip map (block 154). Determining this center for a terrain surface clip map is actually achievable with little system complexity because a single clip texture maps contiguously onto the terrain elevation surface, so the camera coordinates are appropriate. The site model clip map has a clip center of its own and is processed according to its relative size and position on the terrain surface (block 156). The site model clip map, however, does introduce some locality limitations resulting from tall buildings or closely organized buildings. This necessitates the use of an additional look-up table to compensate for the site model clip map's lack of complete spatial coherence. The purpose of the clip grid is to map 3D spatial coordinates to clip center locations in the spatially incoherent clip map.

The clip grid look-up table indices are calculated using a x,y scene location (the camera position) (block 158). If the terrain clip map and site model clip map are different sizes, a scale factor is introduced to normalize x,y scene location for the site model clip map (block 160). It has been found that with sufficient design and advances in the development of the spatial correctness of the building clip map, the need for the clip grid look-up table can be eliminated in up to 95% of the cases.

It is also possible to extend the algorithm and use multiple site model clip maps. Using many smaller clip maps rather than one large clip map may prove to be a useful approach if clip maps of various resolutions are desired or if the paging in and out of clip maps from process space is achievable. However, it requires the maintenance of multiple clip centers and the overhead of multiple clip map pyramids.

Figure 13:
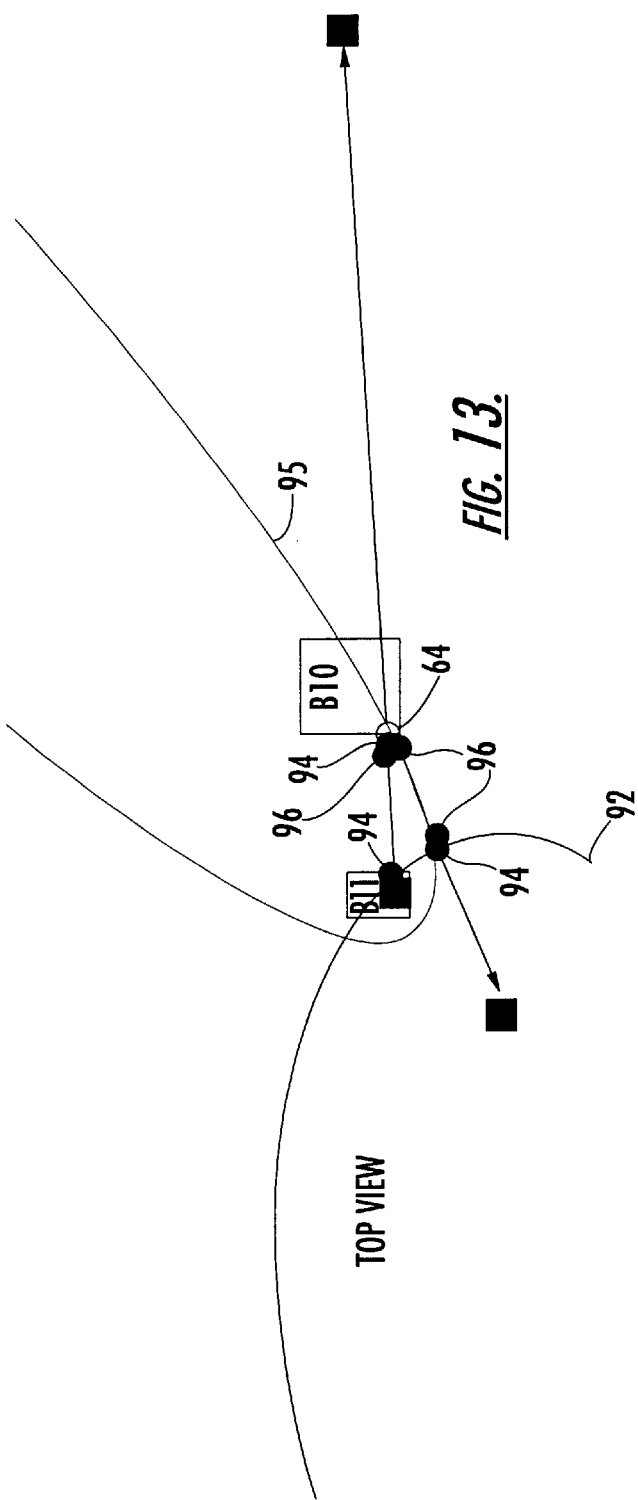
FIGS. 13 and 14 are diagrams, illustrating respective top and isometric views, where the image database routine determines the three dimensional aspects of proxy receivers and buildings for height determinations and more accurate location analysis.
Figure 14:
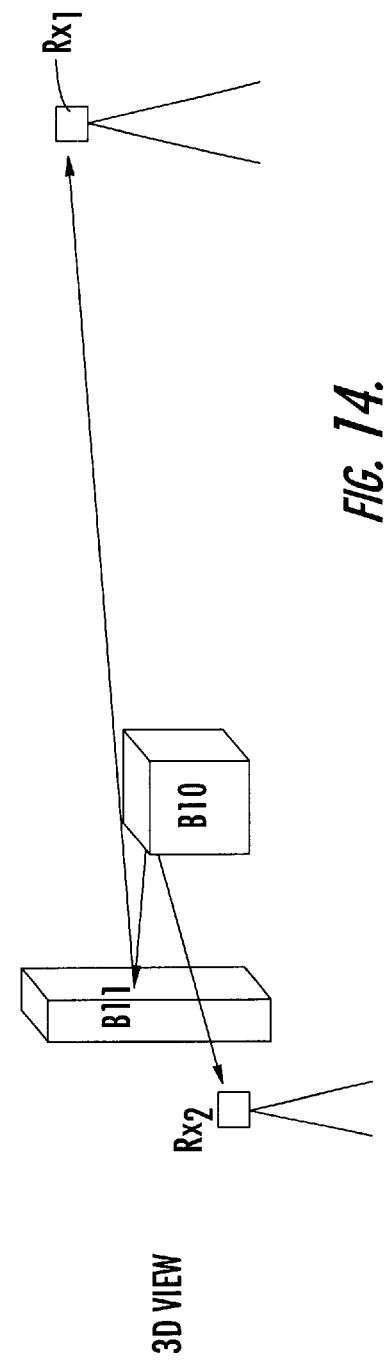

Using the image database, such as the RealSite database and associated software, or a look-up table, if available, it is possible to determine if a proxy receiver also has a certain elevation as a reflector, as shown in FIGS. 13 and 14. FIG. 13 shows a plan view of a building layout, where a first building B10 is located in front of a second building B11. First building B10 has a lower elevation than building B11. The transmitter or mobile transmitting unit 64 is located behind the smaller, first building B10 and reflects its signal off the taller, second building B11 to two receive sites having receivers Rx₁ and Rx₂. Line 92 is representative of a locus of points that are representative of the improper proxy receiver designation due to lack of sufficient knowledge of the elevation of respective buildings B10 and B11 and thus causing an improper designation. Dots 94 represent possible locations based on that data. Line 95 represents the hyperbola with the proper proxy receiver designation and dots 96 represent the possible locations, indicting a greater accuracy. The image database can be used to determine the proper hyperbola and angle to determine the Time Difference of Arrival among associated signals and the proper reflectors (or refractors) and determine the approximate location of the mobile transmitting unit.

As noted above, a Time Difference of Arrival (TDOA) system and not an Angle of Arrival system could use highly directive antennas pointed at selected proxy receivers, such as a water tower, a huge building, a hill or other objects having the requisite signal reflectivity and acting as a proxy receiver. Also, the elevation Angle of Arrival measurements could be used to determine the height of the proxy receiver reflector/refractor. As a result, the line of sight mobile elevation induced slant range errors could be reduced. The proxy receiver reflector/refractor height data would allow slant range calculations from the proxy receiver and would allow the estimation of mobile elevation if a person held a mobile transmitting unit, such as a transmitting tag, personal device such as a mobile tracking device, or other transmitter device.

If one of the receive sites has a direct path, and a proxy receiver is used for the other site, the Time Difference of Arrival error will be reduced unless the proxy receiver happens to lie on the correct bearing to the mobile transmitting unit. If the proxy receiver is on the correct bearing to the mobile transmitting unit, the Time Difference of Arrival error would not change, but the hyperbola will rotate so that it is symmetric about the line between the proxy receiver and the other receive site, as shown in FIG. 13.

If two sites measure the Time of Arrival of a signal from the same proxy receiver, and the calculated Time of Arrival at the proxy receiver differs by the clock offset between the two receive sites, the clock error could then be removed as explained before. This can occur even when the transmitter is of an unknown location. This type of system is advantageous over a transmitter at a known location, which is used to determine clock offsets if the clock offset is calculated within a few samples of all the measured Time of Arrivals and does not represent any additional capacity use.

Beam forming could also be used to point out a specific proxy receiver. Many different types of antennae, as known to those skilled in the art, could be used for beam forming. It is presumed that nulling of paths would be used to remove impacts of other paths on the arriving path. For a four-element system, the system could place nulls on three other paths. It is possible that a user of the system desires to null the largest or may want to null those most closely aligned in time with the path of interest.

The Time of Arrival can be measured by any means known to those skilled in the art, including cross correlating signals from two sites. Naturally, the proxy receiver as a passive reflector could be the earth, and could require the elevation Angle of Arrival. Active repeaters could be used versus passive repeaters, but there would have to be some calculation to account for repeater delay.

There is no requirement that the a proxy receiver be a reflector. Another radio receive site or a transmitter as a mobile transmitting unit could act as a proxy receiver. In addition, the system and method of the present invention could be used to determine the location of a mobile reflector as a proxy receiver. For example, the technique could be used as a passive radar by an aircraft to determine the location of another aircraft.

The first aircraft would measure the Time of Arrival of a signal from a transmitter with a known, but not necessarily fixed location. The aircraft would also measure the Time of Arrival and Angle of Arrival for the same signal reflected by the target, which could be an aircraft. Any beam steering and nulling could be used to improve the ability to detect reflected signals and measure the direction of the arrival. Using the known location of a first aircraft and the transmitter and the direction of arrival of the reflected signal, the location of an aircraft could be calculated.

A transmitter could be one operating cooperatively with the first aircraft or an unwilling third party, such as an FM radio station or even a satellite transponder. By measuring the Time of Arrival and direction of arrival for a signal reflected from the ground and the Time of Arrival and the direction of arrival of a direct pass signal, both emanating from a second aircraft, a first aircraft may determine the location of a second aircraft.

The advantages of the system and method of the present invention are manifest because location can be estimated from a single site if more than one path is received and an appropriate line of sight or database information is known concerning the geographically oriented proxy receivers. Accuracy is improved with time base errors being eliminated for Time Difference of Arrival calculations involving the receive site and associated proxy receivers. Time of Arrivals can be measured relative to the same clock. A significant portion of the mulipath induced Time of Arrival error is reduced in non-line-of-sight situations. Multiple solution sets can provide additional information and allow for weighting and averaging. The imagery from a database can be used to apply corrections.

It is also possible to obtain mobile elevation estimates and mobile locations that are not restricted to a grid. The system is robust against changing multipath because of mobile elevation changes. Extensive calibration is not required. A reflector database does not have to be extensive and could be generated from photographs such as the RealSite database. It could be useful for any system with Angle of Arrival or Time of Arrival systems, i.e. cell systems.

This application is related to copending patent applications entitled, "SYSTEM AND METHOD FOR DETERMINING THE LOCATION OF A TRANSMITTER USING PASSIVE REFLECTORS OR REFRACTORS AS PROXY RECEIVERS" and "SYSTEM AND METHOD FOR DETERMINING THE LOCATION OF A TRANSMITTER USING PASSIVE REFLECTORS OR REFRACTORS AS PROXY RECEIVERS AND USING DATABASE QUERYING," which are filed on the same date and by the same assignee and inventors, the disclosures which are hereby incorporated by reference.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A system for calibrating receivers used for locating a transmitter comprising:
   a transmitter at an unknown location that transmits a signal;
   a proxy receiver that reflects and/or refracts the signal;
   a plurality of spatially oriented receivers that receive the signal from the proxy receiver, each receiver having a clock for determining Time of Arrival, Time Difference of Arrival, or Frequency Difference of Arrival of signals, wherein the clocks are calibrated based on the clock offset.

2. A system according to claim 1, and further comprising a processor associated with each receiver for calculating Time of Arrival, Time Difference of Arrival, or Frequency Difference of Arrival and clock offset.

3. A system according to claim 1, wherein said transmitter comprises a mobile unit.

4. A system according to claim 1, wherein said signal comprises a radio frequency signal.

5. A system according to claim 1, wherein said proxy receiver comprises a natural landmark.

6. A system according to claim 5, wherein said proxy receiver comprises an earth elevation.

7. A system according to claim 1, wherein said proxy receiver comprises a man-made structure.

8. A system according to claim 7, wherein said proxy receiver comprises a building.

9. A system according to claim 1, wherein said plurality of receivers comprise two receivers.

10. A system according to claim 1, wherein each clock comprises a stable local clock.

11. A system for calibrating receivers used for locating a transmitter determination comprising:
    a transmitter at an unknown location that transmits a signal;
    a proxy receiver that reflects and/or refracts the signal;
    a plurality of spatially oriented receivers each having an antenna directed at the proxy receiver for receiving the signal from the proxy receiver, each receiver having a clock for determining Time of Arrival, Time Difference of Arrival, or Frequency Difference of Arrival of signals, wherein the clocks are calibrated based on the clock offset.

12. A system according to claim 11, wherein each antenna comprises a focused beam antenna.

13. A system according to claim 11, and further comprising a processor associated with each receiver for calculating at least one of Time of Arrival, Time Difference of Arrival, or Frequency Difference of Arrival and clock offset.

14. A system according to claim 11, wherein said transmitter comprises a mobile unit.

15. A system according to claim 11, wherein said signal comprises a radio frequency signal.

16. A system according to claim 11, wherein said proxy receiver comprises a natural landmark.

17. A system according to claim 16, wherein said proxy receiver comprises an earth elevation.

18. A system according to claim 11, wherein said proxy receiver comprises a man-made structure.

19. A system according to claim 18, wherein said proxy receiver comprises a building.

20. A system according to claim 11, wherein said plurality of receivers comprise two receivers.

21. A system according to claim 11, wherein each clock comprises a stable local clock.

22. A method of calibrating spatially oriented receivers used in a location determination system comprising the steps of:
    transmitting a signal from an unknown location;
    receiving within each spatially oriented receiver the signal after having reflected and/or refracted from a proxy receiver having a known location, each receiver having a clock for determining at least Time of Arrival, Time Difference of Arrival, or Frequency Difference of Arrival of signals;
    calculating the Time of Arrival, Time Difference of Arrival, or Frequency Difference of Arrival for the signal at each receiver;
    determining the clock offset between the plurality of receivers based on the Time of Arrival, Time Difference of Arrival, or Frequency Difference of Arrival of the signal within each receiver; and
    calibrating the clocks based on the clock offset.

23. A method according to claim 22, and further comprising the step of transmitting the signal from a mobile unit.

24. A method according to claim 22, wherein said signal comprises a radio frequency signal.

25. A method according to claim 22, wherein said proxy receiver comprises a natural landmark.

26. A method according to claim 25, wherein said proxy receiver comprises an earth elevation.

27. A method according to claim 22, wherein said proxy receiver comprises a man-made structure.

28. A method according to claim 27, wherein said proxy receiver comprises a building.

29. A method according to claim 27, wherein each clock comprises a stable local clock.

30. A method according to claim 27, wherein said plurality of receivers comprise two receivers.

31. A method of calibrating spatially oriented receivers used in a location determination system comprising the steps of:
    transmitting a signal from an unknown location;
    reflecting and/or refracting the signal from a proxy receiver having a known location;
    directing an antenna of each receiver at the proxy receiver for receiving the signal within each spatially oriented receiver;
    calculating the Time of Arrival, Time Difference of Arrival, or Frequency Difference of Arrival for the signal at each receiver;
    determining the clock offset between the plurality of receivers; and
    calibrating the clocks based on the clock offset.

32. A method according to claim 31, wherein each antenna comprises a narrow beam antenna.

33. A method according to claim 31, and further comprising the steps of transmitting the signal from a mobile transmitter unit.

34. A method according to claim 31, wherein said signal comprises a radio frequency signal.

35. A method according to claim 31, wherein said proxy receiver comprises a natural landmark.

36. A method according to claim 35, wherein said proxy receiver comprises an earth elevation.

37. A method according to claim 31, wherein said proxy receiver comprises a man-made structure.

38. A method according to claim 35, wherein said proxy receiver comprises a building.

39. A method according to claim 31, wherein each clock comprises a stable local clock.

40. A method according to claim 31, wherein said plurality of receiver s comprise two receivers.

* * * * *